United States Patent [19]

Ida et al.

[11] Patent Number: 4,732,927

[45] Date of Patent: Mar. 22, 1988

[54] RUBBER COMPOSITION FOR TREADS

[75] Inventors: Eiji Ida, Takatsuki; Keijiro Oda, Kawanishi, both of Japan

[73] Assignee: Toyo Tire & Rubber Company Limited, Osaka, Japan

[21] Appl. No.: 941,284

[22] Filed: Dec. 15, 1986

[30] Foreign Application Priority Data

Dec. 28, 1985 [JP] Japan .................. 60-297526

[51] Int. Cl.⁴ .......................... C08K 3/04; C08L 7/09; C08L 9/00; C08L 9/06
[52] U.S. Cl. ........................ 524/495; 524/496; 524/505; 525/95; 525/98; 525/196
[58] Field of Search ................ 524/496, 495, 505; 525/196, 95, 98

[56] References Cited

U.S. PATENT DOCUMENTS

| | | | |
|---|---|---|---|
| 4,071,496 | 1/1978 | Kraus et al. | 524/496 |
| 4,111,867 | 9/1978 | Komuro et al. | 524/496 |
| 4,383,085 | 5/1983 | Fujimaki et al. | 525/196 |
| 4,398,582 | 8/1983 | Yuto et al. | 524/496 |
| 4,433,094 | 2/1984 | Ogawa et al. | 524/496 |

FOREIGN PATENT DOCUMENTS 3220680  1/1983  Fed. Rep. of Germany ...... 525/196
58-125141  12/1983  Japan ...................... 525/196

*Primary Examiner*—Allan M. Lieberman
*Attorney, Agent, or Firm*—Murray and Whisenhunt

[57] ABSTRACT

A rubber composition for treads characterized in that the composition comprises 100 parts by weight of a rubber component and 50 to 100 parts by weight of carbon black admixed therewith, the rubber component comprising 10 to 50 parts by weight of a solution-polymerized star styrene-butadiene rubber (I) having specific styrene content, vinyl content of the butadiene portion and at least 40% in the efficiency of coupling with a tin halide, 20 to 70 parts by weight of a solution-polymerized straight-chain styrene-butadiene rubber (II) having specific styrene content and vinyl content of the butadiene portion and 10 to 50 parts by weight of natural rubber or isoprene rubber (III), the carbon black being in the range of 75 to 105 in nitrogen adsorption specific surface area ($N_2SA$), at least 15 in the difference between $N_2SA$ and the iodine adsorption number (IA) thereof and 0 to 5 in the difference between $N_2SA$ and the cetylitrimethylammonium bromide adsorption specific surface area (CTAB) thereof, the composition being $-50°$ to $-30°$ C. in the peak temperature of loss tangent, tan $\delta$.

3 Claims, 1 Drawing Figure

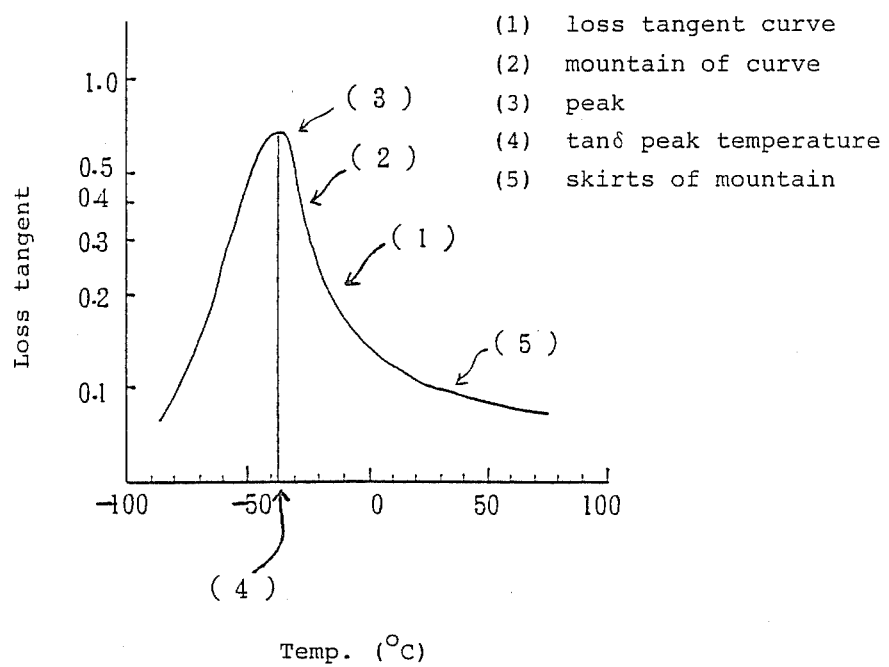

RUBBER COMPOSITION FOR TREADS

The present invention relates to a rubber composition for tire treads which has improved abrasion resistance.

Any point of the tread of a rolling tire as attached to a motor vehicle is compressed and stretched by contact with the ground. The tire is therefore subjected to forced vibration involving compression and stretching while the motor vehicle is running. When rubber is forcibly vibrated, a hysteresis loss occurs which, if great, affords improved wet skid characteristics but undesirably results in increased rolling resistance.

Thus, there is an antinomic relation between low rolling resistance and wet skid resistance with which hysteresis loss is greatly associated. To solve this problem, a styrene-butadiene rubber having a high vinyl content has been proposed as disclosed, for example, in Unexamined Japanese Patent Publication Nos. 62248/1979 and 61029/1982. However, this rubber has poor abrasion resistance. Further since the styrene-butadiene rubber with a high vinyl content has a high glass transition temperature, the tire with a tread of this rubber exhibits low skid resistance when used on iced road surfaces.

BRIEF DESCRIPTION OF THE DRAWING

FIG. 1 is a graph plotting the loss tangent of a rubber composition vs. temperature.

SUMMARY OF THE INVENTION

The main object of the present invention is to provide a rubber composition for the treads of pneumatic tires having low rolling resistance and high wet skid resistance and improved in abrasion resistance and in skid resistance on iced road surfaces so as to be usable throughout the four seasons.

The above and other objects of the invention will become apprent from the following description.

DETAILED DESCRIPTION OF THE INVENTION

The present invention provides a rubber composition for treads characterized in that the composition comprises 100 parts by weight of a rubber component and 50 to 100 parts by weight of carbon black admixed therewith, the rubber component comprising 10 to 50 parts by weight of a solution-polymerized star styrene-butadiene rubber (I) which is 10 to 20 wt. % in styrene content, 30 to 50 wt. % in the vinyl content of the butadiene portion and at least 40% in the efficiency of coupling with a tin halide, 20 to 70 parts by weight of a solution-polymerized straight-chain styrene-butadiene rubber (II) which is 10 to 30 wt. % in styrene content and 10 to 25 wt. % in the vinyl content of the butadiene portion and 10 to 50 parts by weight of natural rubber or isoprene rubber (III), the carbon black being in the range of 75 to 105 in nitrogen adsorption specific surface area ($N_2SA$) calculated in the unit of $m^2/g$, at least 15 in the difference between $N_2SA$ and the iodine adsorption number (IA) thereof calculated in the unit of mg/g and 0 to 5 in the difference between $N_2SA$ and the cetyltrimethylammonium bromide adsorption specific surface area (CTAB) thereof, the composition being $-50°$ to $-30°$ C. in the peak temperature of loss tangent, tan $\delta$, as determined by a dynamic viscoelasticity tester.

The rubber composition of the present invention is useful for various tires, especially for tires for motor vehicles of the front wheel drive type.

When the styrene content of the solution-polymerized star styrene-butadiene rubber (SBR) is less than 10 wt. %, low skid resistance results, whereas if it is over 20 wt. %, the abrasion resistance and skid resistance on iced road surface (hereinafter referred to as "ice skid resistance") reduce. As the vinyl content of the butadiene portion of the SBR increases, a more favorable relation develops between the antinomic properties of wet skid resistance and low rolling resistance, so that the vinyl content must be at least 30 wt. %. Lesser vinyl contents diminish one of these two properties. On the other hand, an increase in the vinyl content impairs the interaction of the carbon and the SBR, and the abrasion resistance decreases when the content exceeds 50 wt. %. Further when both vinyl and styrene contents increase, the glass transition temperature (Tg) of the rubber rises to result in lower ice skid resistance.

The star SBR to be used in the present invention is prepared by dissolving styrene and 1,3-butadiene in an inert solvent such as n-hexane, adding a randomizer such as tetrahydrofuran to the solution, polymerizing the monomers in the presence of a lithium-type catalyst and adding a tin halide in the final stage of the the polymerization reaction to couple the arm of copolymer molecules in the form of stars shape around nuclei of tin and to thereby give an increased molecular weight to the product. Since the coupling reaction is exothermic and takes place within a short period of time, it is desirable to effect coupling under such a condition that some of the copolymer remains unreacted to render the reaction easily controllable. When the molecular weight distribution curve of the product is determined, for example, by gel permeation chromatography, the curve has two peaks, one for the coupled molecule portion and the other for the unreacted molecule portion. The coupling efficiency is expressed in terms of the ratio of the area of the high-molecular-weight portion to the entire area surrounded by the distribution curve. During mixing, the coupled rubber is cleaved at the coupled portions and activated to combine with the active surfaces of carbon black particles and produce an interaction between the two materials, affording reduced rolling resistance and improving the balance between the low rolling resistance and wet skid resistance.

When the coupling efficiency is below 40%, sufficient interaction does not occur, whereas even if exceeding 90%, the high coupling efficiency will not produce a great effect corresponding to it but entails an increased production cost. The preferred coupling efficiency is therefore up to 90%.

Like the star-shape SBR, the solution-polymerized straight-chain SBR useful for the invention gives low wet skid resistance when containing less than 10 wt. % of styrene, or poor abrasion resistance when containing more than 30 wt. % of styrene. The butadiene block of the SBR must be 10 to 25 wt. % in vinyl content. The composition exhibits low wet skid resistance if the content is below 10 wt. %, or is less effective in giving improved ice skid resistance when it is over 25 wt. %.

The solution-polymerized SBR is low in green strength, insufficient in tackiness and therefore its processability is poor, so that natural rubber (NR) or isoprene rubber (IR) is blended therewith according to the present invention to give improved processability.

With the present invention, 100 parts (by weight, the same as hereinafter) of the rubber component is prepared by blending together 10 to 50 parts, preferably 15 to 25 parts, of the solution-polymerized star SBR, 20 to 70 parts, preferably 30 to 60 parts, of the solution-polymerized straight-chain SBR and 10 to 50 parts of NR or IR. If the proportion of the star SBR is less than 10 parts, the proportion of the straight-chain SBR is correspondingly greater to result in lower wet skid resistance. If the proportion of the star SBR exceeds 50 parts, especially 30 parts, the amount of the straight-chain SBR relatively decreases, entailing lower ice skid resistance. At least 20 parts of the straight-chain SBR needs to be present in giving improved ice skid resistance.

When the carbon black to be used in the invention is less than 75 in nitrogen adsorption specific surface area ($N_2SA$) as determined from the amount of nitrogen adsorbed by the carbon black and calculated in the unit of $m^2/g$, good abrasion resistance is not available, whereas if this value is greater than 105, the rolling resistance increases. In the case of the conventional carbon, the iodine adsorption number (IA) determined from the amount of iodine adsorbed by the carbon and calculated in the unit of mg/g is nearly equal to the $N_2SA$. However, when the carbon particles have surface portions of increased chemical activity, these portions adsorb a lesser amount of iodine, rendering IA smaller than $N_2SA$. As the difference between $N_2SA$ and IA increases beyond 15, carbon exhibits greater surface activity, with the result that an enhanced interaction occurs between carbon and rubber, especially rubber coupled with tin, to afford lower rolling resistance.

When carbon black is great in the difference between $N_2SA$ and the cetyltrimethylammonium bromide adsorption specific surface area (CTAB) determined by the cetyltrimethylammonium bromide adsorption method and calculated in the unit of $m^2/g$, the carbon particles have a large number of fine pores on the surface to result in impaired wet skid resistance. Preferably, therefore, the difference is up to 5.

According to the present invention, it is desirable to use 50 to 100 parts of the specified carbon black per 100 parts of the rubber component.

The rubber composition of the present invention is prepared by mixing the foregoing components together by usual means such as rolls, Banbury mixer or kneader. It is of course possible to incorporate into the composition other known additives such as vulcanizing agent, vulcanization accelerator, activator, retarder, reinforcing agent, antioxidant, etc.

It is required that the rubber composition of the present invention be in the range of $-50°$ to $-30°$ C. in the peak temperature of loss tangent, tan $\delta$, as determined by a dynamic viscoelasticity tester. With reference to FIG. 1, the tan $\delta$ peak temperature 4 was determined with use of a viscoelasticity spectrometer, product of Iwamoto Seisakusko Co., Ltd., by measuring the loss tangent of the composition at a frequency of 100 Hz while raising the temperature at a rate of 2° C./min, plotting the loss tangent versus the temperature as illustrated to obtain a loss tangent curve 1, and reading the temperature at the peak 3 of the curve 1.

The present invention will be described with reference to the following examples and comparative examples, in which the parts are by weight.

Pico abrasion test was conducted according to ASTM D2228. The reciprocal of the abrasion loss was expressed in terms of an index relative to the value of Compound 12 as a control. The higher the value, the higher is the abrasion resistance.

Ice skid resistance test was conducted using a skid tester of Stanley, U.K. The skid was measured on an iced surface at a temperature of $-10°$ C. and the reciprocal of skid was expressed in index relative to the value of Compound 12 as a control. The higher the value, the better is the result.

Steel radial tires 165SR13 were prepared using each test compound and tested for rolling resistance and wet skid resistance.

The rolling resistance of the tire was determined according to the standard SAE-J1269 of Society of Automotive Engineers, Inc., U.S.A. and expressed in index relative to the value of Compound 12 as a control. The smaller the value, the better is the result.

The wet skid resistance of the tire was determined on a concrete surface sprinkled with water according to the test method prescribed in Uniform Tire Qality Grading and expressed in index relative to the value of Compound 12 as a control. The higher the value, the better is the result.

The components used in the examples and comparative examples are given below.

(1) Star SBR

TABLE 1

| Rubber No. | A | B | C | D |
|---|---|---|---|---|
| styrene content (wt. %) | 19 | 11 | 21 | 5 |
| vinyl content (wt. %) | 35 | 50 | 52 | 28 |
| coupling efficiency (%) | 51 | 50 | 27 | 25 |

(2) Straight-chain SBR

TABLE 2

| Rubber No. | 1 | 2 | 3 |
|---|---|---|---|
| styrene content (wt. %) | 18 | 25 | 34 |
| vinyl content (wt. %) | 13 | 13 | 31 |

(3) Carbon Black

TABLE 3

| Carbon No. | a | b | c | d | e |
|---|---|---|---|---|---|
| $N_2SA$ | 77 | 100 | 118 | 70 | 93 |
| IA | 55 | 83 | 120 | 55 | 91 |
| CTAB | 77 | 98 | 112 | 69 | 91 |
| $N_2SA-IA$ | 22 | 17 | −2 | 15 | 2 |
| $N_2SA-CTAB$ | 0 | 2 | 6 | −1 | 2 |

The coupling agent used was $SnCl_4$.

The styrene content of the rubber and the vinyl content of the butadiene portion thereof were calculated by Hampton's method from an adsorption spectrum obtained by an infrared spectrophotometer.

The colloidal properties of the carbon were determined by the following ASTM.
$N_2SA$: ASTM D3037
IA: ASTM D1765
CATB: ASTM D3765
Carbon (e) was N339.

EXAMPLES AND COMPARATIVE EXAMPLES

Rubber compounds were prepared from the SBRs of micro structure listed in Tables 1 and 2, natural rubber, carbon black having the colloidal properties shown in Table 3 and an aromatic oil, each in the amount specified in Table 4, 3 parts of zinc oxide, 2 parts of stearic acid, 1.5 parts of N-phenyl-N'-(1,3-dimethyl)-p-phenylenediamine, 1 part of N-cyclohexyl-2-benzothiazolylsulfenamide, 0.4 part of 1,3-diphenylguanidine and 2.2 parts of sulfur. Each of the compounds was molded to the shapes specified by the test methods and tested for Pico abrasion resistance and ice skid resistance. Tires were also prepared using the compound and tested for wet skid resistance and rolling resistance. Table 4 shows the results.

ture and is therefore low in ice skid resistance and in abrasion resistance despite the presence of carbon black of good abrasion resistance. Compound 7, containing carbon black (d) of less than 75 in $N_2SA$, has low abrasion resistance although incorporating star and straight-chain SBRs of low styrene content. Presence of carbon black (c) which is over 105 in $N_2SA$ gives Compound 6 poor rolling resistance. Compound 6 or 10 comprising carbon black (c) or carbon black (e) which is less than 15 in the difference between $N_2SA$ and IA has a small wet skid/rolling resistance ratio, hence poor balance between these properties.

TABLE 4

| Compound No. | 1 | 2 | 3 | 4 | 5 | 6 | 7 | 8 | 9 | 10 | 11 | 12 |
|---|---|---|---|---|---|---|---|---|---|---|---|---|
| Star SBR | | | | | | | | | | | | |
| A | 25 | | 15 | | | | | | | | | |
| B | | 15 | | 20 | 50 | | | 5 | 25 | 25 | | 100 |
| C | | | | | | 50 | | | | | 75 | |
| D | | | | | | | 55 | | | | | |
| straight-chain SBR | | | | | | | | | | | | |
| 1 | 50 | | | | | | 15 | | | | | |
| 2 | | 55 | 65 | 40 | 20 | 30 | | 85 | | 45 | | |
| 3 | | | | | | | | | 60 | | | |
| NR | 25 | 30 | 20 | 40 | 30 | 20 | 30 | 10 | 15 | 30 | 25 | |
| carbon black | | | | | | | | | | | | |
| a | | 85 | | 95 | | | | | | | 60 | |
| b | 60 | | 70 | | 55 | | | 65 | | | | |
| c | | | | | | 105 | | | | 70 | | |
| d | | | | | | | 45 | | | | | |
| e | | | | | | | | | 70 | | | 65 |
| aromatic oil | 30 | 40 | 35 | 50 | 25 | 60 | 10 | 20 | 35 | 30 | 30 | 25 |
| less tangent peak temp (°C.) | −44 | −38 | −39 | −37 | −33 | −26 | −48 | −40 | −23 | −36 | −24 | −29 |
| Pico abrasion resistance | 106 | 105 | 113 | 111 | 105 | 96 | 98 | 105 | 86 | 94 | 83 | 100 |
| ice skid resistance | 118 | 113 | 113 | 115 | 107 | 98 | 115 | 110 | 118 | 96 | 100 | |
| tire rolling resistance | 94 | 100 | 98 | 100 | 97 | 122 | 90 | 95 | 111 | 105 | 107 | 100 |
| tire wet skid resistance | 100 | 106 | 100 | 103 | 99 | 118 | 86 | 95 | 110 | 100 | 109 | 100 |
| wet skid/rolling resistance | 1.04 | 1.06 | 1.02 | 1.03 | 1.02 | 0.97 | 0.95 | 1.00 | 0.99 | 0.95 | 1.01 | 1.00 |

Compounds No. 1 to No. 5 according to the invention are superior to Compound 12 (control) in every test item, although Compound 5 comprising 50 wt. % of star SBR is lower than Compounds 1 to 4 in ice skid resistance.

Compound 11, which is free from straight-chain SBR of low vinyl content, is low in ice skid resistance since the straight-chain SBR, if present, would be effective to reduce the loss tangent peak temperature.

Compound 7 comprising star SBRD with a styrene content of less than 10 wt. % is low in wet skid resistance. Compound 6 incorporating SBRC with a styrene content of over 20 wt. % is low in both abrasion resistance and ice skid resistance.

Compound 7 in which star SBRD is present with a vinyl content of less than 30 wt. % has poor balance between rolling resistance and wet skid resistance as indicated by the wet skid/rolling resistance ratio. Compound 6 containing SBRC with a vinyl content of over 50 wt. % is low in abrasion resistance in spite of the presence of carbon with a great $N_2SA$.

Compounds 6 and 7 comprising SBRC or D which is less than 40% in coupling efficiency have a low wet skid/rolling resistance ratio, indicating poor balance between the two resistance characteristics.

Compound 8 comprising more than 70 wt. % of straight-chain SBR is low in loss tangent peak temperature and is poor in wet skid resistance and has poor balance between the wet skid resistance and rolling resistance.

Compound 9 incorporating straight-chain SBR exceeding 30 wt. % in styrene content and 25 wt. % in vinyl content, has too high a loss tangent peak temperature The tread rubber composition of the invention which comprises a rubber component composed of a star SBR and a straight-chain SBR of specified micro structure, and carbon black having specified colloidal properties and blended with the rubber component and which has a loss tangent peak temperature in a specified range is useful for pneumatic tires having low rolling resistance and high wet skid resistance and improved in abrasion resistance and in skid resistance on iced road surfaces so as to be usable throughout the four seasons. The present composition is especially useful for the treads of tires for front wheel drive motor vehicles of which high abrasion resistance is required.

What is claimed is:

1. A rubber composition for treads characterized in that the composition comprises 100 parts by weight of a rubber component and 50 to 100 parts by weight of carbon black admixed therewith, the rubber component comprising 10 to 50 parts by weight of a solution-polymerized star styrene-butadiene rubber (I) which is 10 to 20 wt. % in styrene content, 30 to 50 wt. % in the vinyl content of the butadiene portion and at least 40% in the efficiency of coupling with a tin halide, 20 to 70 parts by weight of a solution-polymerized straight-chain styrene-butadiene rubber (II) which is 10 to 30 wt. % in styrene content and 10 to 25 wt. % in the vinyl content of the butadiene portion and 10 to 50 parts by weight of natural rubber or isoprene rubber (III), the carbon black being in the range of 75 to 105 in nitrogen adsorption specific surface area ($N_2SA$) calculated in the unit of $m^2/g$, at least 15 in the difference between $N_2SA$ and the iodine adsorption number (IA) thereof calculated in the unit of mg/g and 0 to 5 in the difference between $N_2SA$ and the cetyltrimethylammonium bromide adsorption specific surface area (CTAB) thereof, the composition being $-50°$ to $-30°$ C. in the peak temperature of loss tangent, tan δ, as determined by a dynamic viscoelasticity tester.

2. A rubber composition as defined in claim 1 wherein the rubber component comprises 15 to 25 parts by weight of the star styrene-butadiene rubber (I).

3. A rubber composition as defined in claim 1 wherein the rubber component comprises 30 to 60 parts by weight of the straight-chain styrene-butadiene rubber (II).

* * * * *